UNITED STATES PATENT OFFICE.

MAX WEILER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

TRIPHENYLMETHANE DYE.

1,004,609.     Specification of Letters Patent.     Patented Oct. 3, 1911.

No Drawing.     Application filed February 7, 1911. Serial No. 607,173.

*To all whom it may concern:*

Be it known that I, MAX WEILER, doctor of philosophy, chemist, citizen of the German Empire, residing at Elberfeld, Germany, have invented new and useful Improvements in New Blue Dye, of which the following is a specification.

The present invention relates to the manufacture and production of a new triphenylmethane dye, which is distinguished by a high fastness to alkali and to milling.

The process for its production consists in condensing dibromo-meta-oxy-benzaldehyde with ortho-cresotinic acid and oxidizing the leuco compound.

In order to illustrate the new process more fully the following example is given, the parts being by weight:—28 parts of dibromo-meta-oxybenzaldehyde and 32 parts of ortho-cresotinic acid are stirred with 350 parts of strong sulfuric acid at about 20–35° C., until the aldehyde can no more be proved to be present in the mixture. The melt is poured in 600 parts of ice water and filtered off. The leuco acid can be further purified by dissolving it in soda and separating it again with an acid. The product thus produced is insoluble in water, easily soluble in chloroform and very easily soluble in acetone. The acetone solution assumes an intense blue color by heating it with bichromate and sulfuric acid. Ferric chlorid gives in an alcoholic solution a pure blue tint. For oxidation the leuco acid is dissolved in strong sulfuric acid and the solution is stirred with the addition of the necessary quantity of nitrite at 30–35° C. until the quantity of the dyestuff produced does no longer increase. The melt is poured on ice. The dyestuff thus separated is after being dried and pulverized a red powder. It is slightly soluble in hot water with a red color and easily soluble in caustic soda lye with an intense violet color, and has probably the following formula:

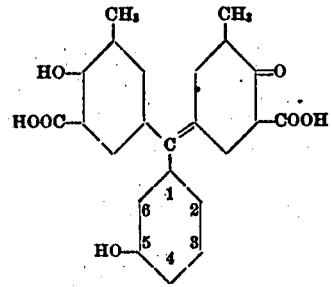

in which formula two atoms of bromin are substituted in the oxybenzene nucleus either at the 2.4, 2.6, or the 4.6 position.

The new dye furnished greenish blue shades on chroming. It can also be dyed on wool which has been previously treated with chrome or in one bath with sulfuric acid and bichromate.

I claim:—

The herein described new dye having probably the following formula:

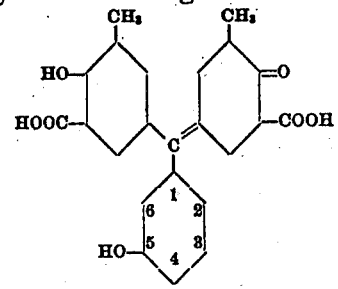

in which formula two atoms of bromin are substituted in the oxybenzene nucleus substituted in the oxybenzene nucleus. which is after being dried and pulverized a red powder soluble in hot water with a red color, soluble in caustic soda lye with a violet color; dyeing chromed wool greenish-blue shades, substantially as described.

In testimony whereof I have hereunto set my hand in the presence of two subscribing witnesses.

MAX WEILER. [L. S.]

Witnesses:
CHAS J. WRIGHT,
WALTER VONNEGUT.